Oct. 6, 1959     F. G. PAXTON ET AL     2,907,586
CODE MARKING METHOD AND APPARATUS
Filed July 1, 1957     2 Sheets-Sheet 1
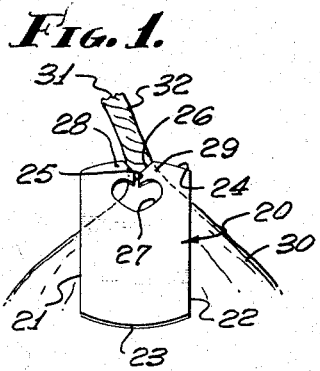
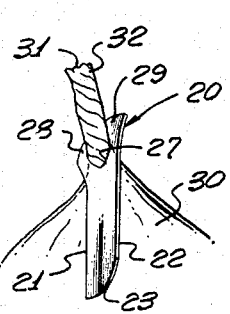
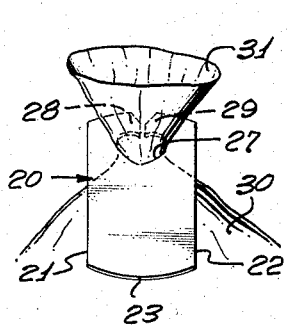
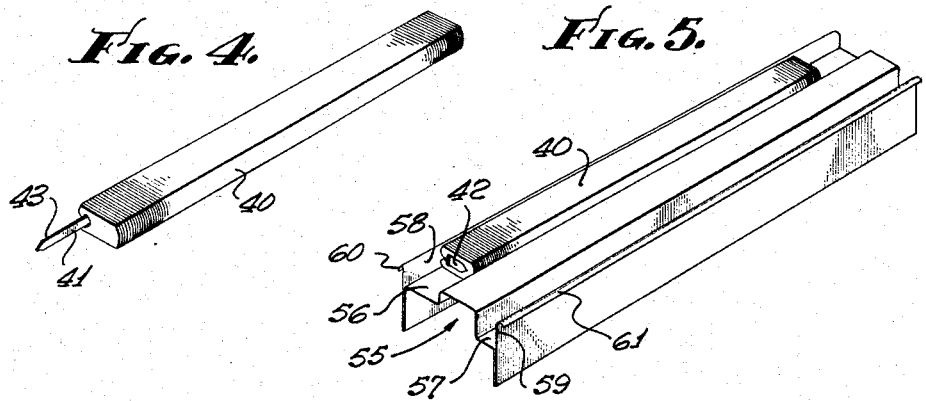
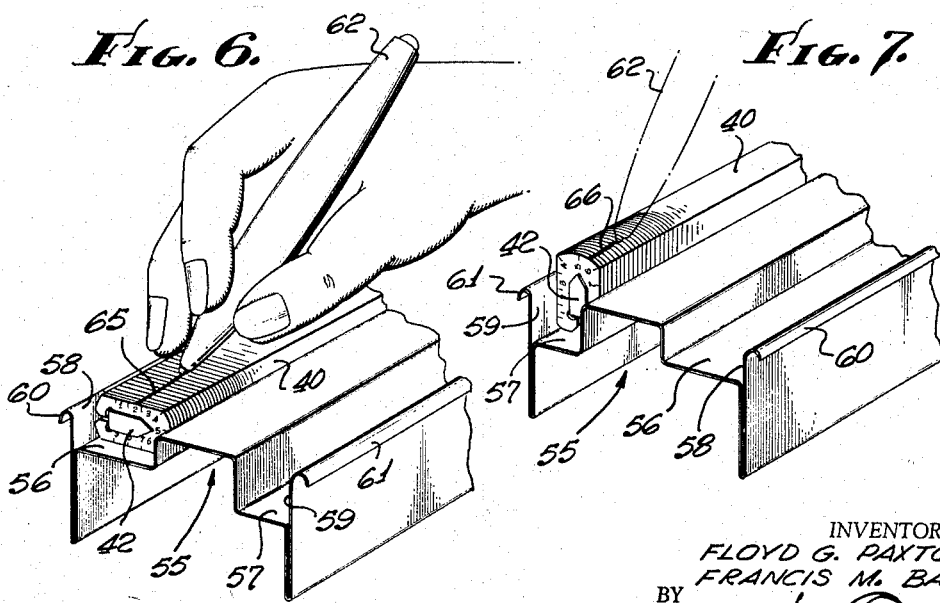
INVENTORS.
FLOYD G. PAXTON
FRANCIS M. BAER
BY
ATTORNEY.

Oct. 6, 1959    F. G. PAXTON ET AL    2,907,586
CODE MARKING METHOD AND APPARATUS
Filed July 1, 1957    2 Sheets-Sheet 2
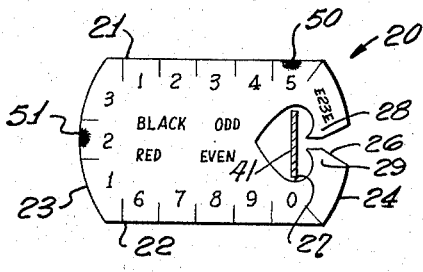
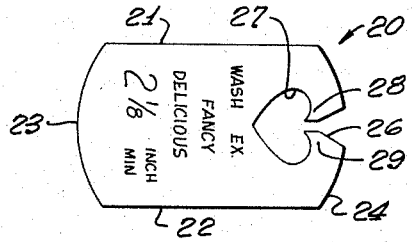
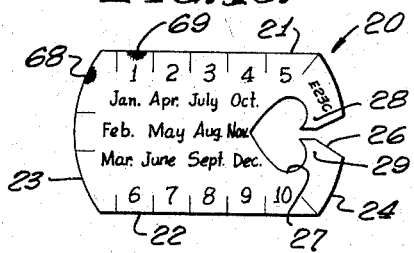
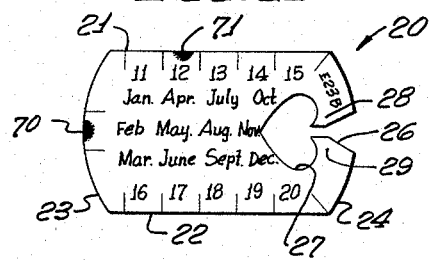
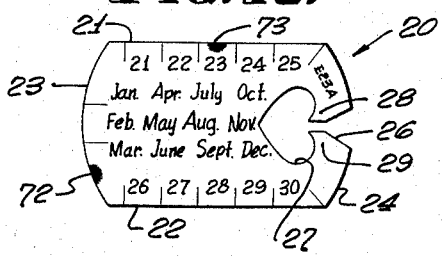
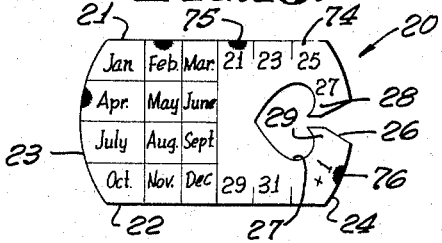
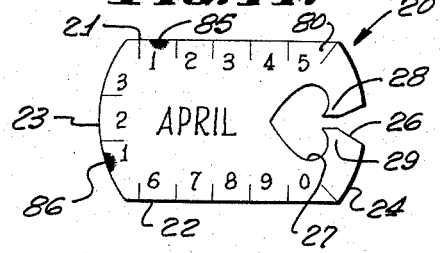
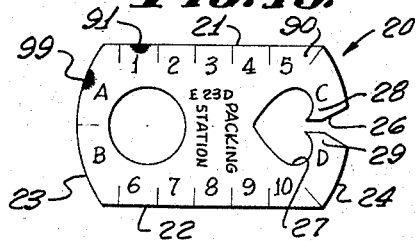
INVENTORS.
FLOYD G. PAXTON
FRANCIS M. BAER
BY
ATTORNEY.

United States Patent Office 2,907,586
Patented Oct. 6, 1959

2,907,586

CODE MARKING METHOD AND APPARATUS

Floyd G. Paxton and Francis M. Baer, Yakima, Wash., assignors to Kwik Lok Corporation, Yakima, Wash., a corporation of Washington Application July 1, 1957, Serial No. 669,328

12 Claims. (Cl. 283—18)

This invention relates to code marking and is particularly useful in code marking packages of agricultural products.

It is a primary object of the present invention to provide a simple method and apparatus for tagging packages of products to give coded information regarding said products which is useful in subsequent handling of these packages.

It is another object of the invention to provide such a method and apparatus which requires a relatively small inventory of tags to be carried by those using the system.

A further object of the invention is to provide such a method and apparatus which will reveal coded information as to any of a great variety of facts of importance regarding each individual package of the product (and particularly farm products) such as the geographic location of its source, the identity of the individual producer, the identity of the individual worker packing the same, the identity of the product washing station, the date the product was packaged, and sometimes the identity of the farm or even the individual tree on which an agricultural product was grown.

A yet further object of the invention is to provide such a method and apparatus offering a very simple method and means for producing code bearing tags, at the point of use of such tags, from tags which are otherwise blank but having suitable forms printed thereon which will render intelligible distinguishing marks applied to edges of said tags.

Another object of the invention is to provide such a method and apparatus in which the tags embody within themselves means for securing them to the product, and in which said means facilitates the operation of marking the edges of a column of said tags to cause these to reflect the desired coded information.

Yet another object of the invention is to provide such a method and apparatus which includes a relatively inexpensive rack for holding a column of tags and guiding the hand of the worker while marking edges of the tags in said column.

It is also an object of the invention to provide a rack for holding a column of tags so as to expose either certain end edges of the tags in said column or certain side edges thereof for applying marks as aforesaid to the tags in said column by making a continuous mark extending lengthwise of said column which forms individual marks in a uniform location on all of the tags in said column.

Another object of the invention is to provide a code marking tag having thereon a printed form giving code significance to any of a plurality of marks applied selectively to different portions of the edge of said tag.

It is likewise an object of the invention to provide a code marking tag having a form printed thereon to which significance is given by the selective application of one mark along one edge of said card and a second mark along a different edge of said card.

It is an important object of the invention to provide in such a code marking method and apparatus, a means for packaging said code-indicia-bearing tags for shipment which will hold said tags tightly in superimposed relation in a column with all like code indicia bearing faces on said tags turned in the same direction and with said tags uniformly oriented relative to each other with their edges flush, and with corresponding edges of said tags uniting to form each of the respective longitudinal faces of said column, and with said column faces exposed to facilitate applying a longitudinal mark, parallel with said column, on at least one of said column faces, with said mark extending the entire length of said column, and thereby uniformly investing said code indicia on each tag with the same code significance.

The manner of accomplishing the foregoing objects as well as further objects and advantages will be made manifest in the following description taken in connection with the accompanying drawings in which—

Fig. 1 is a diagrammatic perspective view of a preferred embodiment of the code marking tag of the present invention shown as it is about to be applied to the twisted neck of a plastic bag.

Fig. 2 is a view similar to Fig. 1 and illustrates the next step in the application of said tag to said bag.

Fig. 3 is a view similar to Figs. 1 and 2 which shows the completion of the application of said tag to said bag and with the neck of the bag expanded as when hold on said neck is released.

Fig. 4 is a perspective view of a column of said tags placed in compact superimposed, longitudinal alignment and held in said alignment by a metal strap which extends through non-circular holes formed uniformly in said tags, whereby substantial rotation of said tags about said strap is prevented.

Fig. 5 is a perspective view of the marking tray of the invention with said column of tags resting in one of the supporting troughs provided by said tray.

Fig. 6 is an enlarged fragmentary perspective view of the tray shown in Fig. 5 with the column of tags resting therein and showing the manner in which said tray helps in the application of a longitudinal marking line to a wide edge of said column of tags by a manual marking device.

Fig. 7 is a fragmentary perspective view of the opposite end of said marking tray from that shown in Fig. 6 and also indicating the manner in which said tray facilitates the application of a longitudinal marking line to a narrow edge of said column of tags.

Fig. 8 is a face view of one of the tags of the invention and illustrates a printed form provided on said tag for rendering significant a mark placed selectively along one edge of said tag and a second mark placed selectively along a different edge of said tag. This tag is adapted for use in a 60 day coding operation. This view also shows the tag column packaging strap of the invention in section where this strap extends through the non-circular hole in the tag of the invention.

Fig. 9 is a reverse view of the tag shown in Fig. 8 and illustrates how a single tag may not only be used for a coding operation but also may function as a label for the goods to which the tag is attached.

Fig. 10 is a face view of a tag of the invention having a different type of form printed thereon for use during the first ten days of the month in a 90 day coding operation.

Fig. 11 is a face view of a companion tag for the tag shown in Fig. 10 and which is used for indicating a date coming somewhere within the second ten days of a month.

Fig. 12 is a face view of a companion tag for use in conjunction with the tags shown in Figs. 10 and 11 for indicating a date falling somewhere within the third ten days of a given month.

Fig. 13 is a face view of a tag of the invention and illustrates a form printed on said tag for use in a one year coding operation and indicates a precise month and a particular day in said month.

Fig. 14 is a face view of a tag of the invention which is used in a 30 day coding operation and for marking the date only in one particular month, the name of which is printed directly on the tag so that the tag is only good for identifying products produced within that particular month.

Fig. 15 is a face view of a tag of the invention with data printed thereon whereby the tag will have significance in identifying a packing station where a product is packed when suitable marks are applied to the edges of the tag.

Fig. 16 is a view of a tag similar to that shown in Fig. 8, but wherein marking of selected edges of the tag is effected by abrading the material of the tag to form notches therein.

Referring specifically to the drawings, the invention is there shown as embracing a novel tag 20 which is so shaped that it has within itself a means for securing it to a package. While adapted to be made out of many different materials and in varying dimensions, a practical material for making the tag 20 has been found to be a styron plastic that is unaffected by either water or chemicals used in the treatment of fruit. The tag 20 is preferably about 1/32 of an inch thick and the size commonly used is 1⅜ inches long and approximately ⅞ of an inch wide.

The tag has two longitudinal edges 21 and 22, an arcuate end edge 23 and an opposite arcuate end edge 24 which is broken by a central slot 25 having converging cam faces 26 and communicating interiorly with a non-circular heart-shaped hole 27. The heart-shaped hole 27 and notch 25 produce two hook-shaped jaws 28 and 29 on the tag 20 which operate in the following manner to hold the tag onto a package.

In Fig. 1, a plastic bag 30 is shown, the open end 31 of which is twisted by hand into a rope 32 to facilitate the application of the tag 20. While the open end 31 is thus twisted into a rope with one hand, the tag 20 is applied with the other hand so as to press the cam faces 26 against the rope 32 as shown in Fig. 1. The tag 20 is now twisted as shown in Fig. 2 and pressed against the rope 32. This causes one of the hooks, which, in the case illustrated in Fig. 2 where the tag is twisted anticlockwise, is the hook 29, to slip downwardly behind the rope 32. The hook 28 is at the same time caused to extend upwardly on the front side of the rope 32 as shown in Fig. 2.

While still pressing the tag 20 against the twisted neck 31 of the bag 30 as shown in Fig. 2, the tag is turned back on its longitudinal axis to the position in which it was originally pressed against the bag neck. This causes the jaws 28 and 29 to drop behind the twisted bag neck with the bag neck disposed in the heart-shaped opening 27. When the twisted bag neck is released it expands from the form in which it is shown in Fig. 2 to the conical shape shown in Fig. 3. The bag 30 is now effectively closed by the tag 20.

An optional manner of applying the tag 20 is to press it downwardly or upwardly from the position of the tag shown in Fig. 1 while pushing it against the rope 32. This spreads the hooks 28 and 29 until the rope 32 has passed between them into the heart shaped hole 27. When the tag 20 is now released, the hooks 28 and 29 spring together, trapping rope 32.

While the tags 20 may be packaged in any manner desired, it is one feature of the present invention to package these tags in the form of a stack or column 40 of tags, superimposed one upon the other evenly with their edges flush so that the heart-shaped openings 27 are all in alignment, a metal strap 41 having a holding finger 42 bent from one end being extended through the holes 27, after which the opposite extending end 43 of said strap is bent across the end of column 40 to prevent the escape of any of the tags 20.

The tags 20 of the invention have wide utility, as they embody, in one simple little sheet of material, a very effective, quickly attachable and detachable bag closure as well as comprising a tag for any of the purposes that a tag may be used. Thus the tags 20 may serve as labels for the product packaged in the bags 30, while at the same time forming a closure for that bag. If it is not desired to have the tags 20 perform the function of a closure and the product packaged is bound with cords, the tags 20 may be fastened onto a cord in the same manner as they are above described as fastened to an open end of a bag twisted into a rope 32.

In the present invention, each tag 20 is adapted to supply coded indicia or information regarding the product contained in a package to which the tag is attached and possibly simultaneously serve as a label for the product. While the information which the tags 20 may be designed to reflect in the code marking method and apparatus of this invention vary widely in character, the principal use for this invention is in dating the product in the packages to which tags 20 are attached or in identifying the individual farmer producing the product or the packer who packs the product in the packages so marked.

The method and apparatus of the invention will therefore be described as employed in code marking a product to supply these two types of information.

The more perishable the product packaged, the more important it is for those handling this product in the markets to keep tab on the date that the product was placed in each individual package being handled so as to prevent their retaining a perishable product on their shelves until it spoils. With the date of packaging readily ascertainable by the dealer in perishable products he is thus enabled to push the sale of the older products by lowering the price so that these will all be purchased by the ultimate consumers while they are still in good condition.

To understand the serviceability of the coding systems embraced within the present invention, it is necessary to realize that the perishable fruits and vegetables on which these systems are designed to be employed generally move through the channels of trade from the date of packaging the product to the date of purchase by the ultimate consumer in just a few weeks. However the period within which a product is likely to spoil varies with different products. Thus the invention provides a straight thirty-day code, the tag for which is shown in Fig. 14. A sixty-day retail code is provided that covers a sixty-day period and the tags for this are illustrated in Figs. 8 and 9. It also provides a ninety-day code system, the tags for which are illustrated in Figs. 10, 11 and 12. Finally, the invention provides a yearly code, the tags for which are illustrated in Fig. 13.

Referring now to Figs. 8 and 9, a sixty-day retail code is there shown as set up on tags identified as "E23E." Each of the longitudinal edges of tags E23E is divided by lines extending inwardly from the edge of the tag into five spaces and edge 21 has these spaces numbered "1, 2, 3, 4 and 5" while the corresponding spaces on edge 22 are numbered "6, 7, 8, 9 and 0." End edge 23 of tag E23E is divided into three spaces and these are numbered "1, 2 and 3." Printed on the face of tag E23E are the words "Black Odd" and "Red Even." The marking of tag E23E to give a coded indication of a given date of a certain month in a sixty-day period is accomplished by applying one mark along edge 21 or edge 22 in a selected one of the five spaces thereof and another mark along edge 23 in a selected one of the three spaces thereof, using the space dividing lines as a guide for locating the mark therebetween. Thus Fig. 8 shows a mark 50 placed opposite the numeral 5 on edge 21 of tag E23E and a mark 51 placed opposite the numeral 2 on edge 23 of said tag.

The marks 50 and 51, as are all of the marks applied to tags 20 in the method of this invention, are preferably applied by means of a plastic solvent carrying a dye which penetrates the material of the tag and leaves a very perceptible mark of a given color where this solvent is applied. In marking a tag E23E in performing the sixty-day code of the invention, a choice of the color to be used for the marks 50 and 51 is required in accordance with the month to be designated by this tag. If the month is odd-numbered the marks 50 and 51 are applied in black. If the month is even-numbered the marks are applied in red. Mark 51 is opposite either the numeral "1," the numeral "2" or the numeral "3" appearing on edge 23 of the tag. Whichever of these numerals mark 51 is opposite, this mark indicates the first digit of a two-digit numeral. If the number of the day of the month to be indicated in code by tag E23E is less than 10, no mark 51 is applied to the tag. This tag as marked in Fig. 8 indicates the 25th of the month.

To show how a tag marked as shown in Fig. 8 will perform its function, let it be assumed that this tag appeared on a package of perishable fruit on a retailer's shelves on April 15th and that marks 50 and 51 were in black ink. This tag would thus indicate a packing date of March 25th, because black ink indicates an odd numbered month and the only odd numbered month the 25th day of which precedes April 15th less than 60 days is March. If, however, the indicator marks were in red ink, the packing date would be February 25th and the merchandise would be approximately two months old. It is relatively easy of course for the retailer to distinguish between two packages of fruit, one of which is relatively fresh and the other of which is about sixty days old. Very little difficulty is experienced therefore in reading the coded date shown on the tags E23E by the method above described.

It is desired to point out that for the sixty-day retail code above described only one type of tag must be inventoried and these tags may be used any time in the year to correctly indicate by this code the date of packaging of a perishable product whereby the retailer may always know in checking the goods on his shelves which of these are the oldest and therefore expedite their early sale in order to get them into use before they spoil.

In performing the method involved in the sixty-day retail code above described, two pens, one containing black ink and the other containing red ink, are required and care must be taken that only black ink is used to mark the tags in odd months and only red ink used to mark the tags in even months.

Fig. 9 shows the reverse face of tag E23E shown in Fig. 8 and illustrates how this reverse face of the tag may be used as a label for the product contained in the package to which the tag is applied. Thus the tag may perform the triple function of closing the package, providing coded information as to the date the product was placed in the package, and also exhibiting any information which it is desired to publish regarding the product itself such as the name of the variety of the product, the grade of the product and the size of it. The reverse face of the tag may also be used to carry the trademark of the shipper and identify the shipper by name.

The invention includes an economical method of applying marks 50 and 51 to the tags E23E or any marks to tags 20 in any of the various code systems embraced by the invention. This tag marking method is illustrated in Figs. 4, 5, 6 and 7. The method in its simplest form is to lay a column 40 of tags 20, held together by its strap 41, on a flat surface and perhaps against a ruler or other guide to keep the column in straight conformation and while holding the column down with one hand apply an ink marking pencil with the other hand, guiding the hand on the column 40 itself and drawing the marking pencil along the column 40 so as to apply a longitudinal line of ink in a selected transverse position along the upwardly exposed edges of the tags in the column.

When the tags in the column 40 are separated after being thus marked, all the tags in the column have a mark on the edges thereof which have been exposed upwardly and these marks are uniformly placed on all of said tags. In a similar manner a mark may be applied to a column 40 of tags 20 along the end edges 23 or 24 of said tags by applying a ruler to the opposite side of the column 40 and running the ink pencil along the face of the column 40 comprising the end edges 23, or 24, as the case may be, of the tags 20.

The apparatus of the invention embraces an elongated tray 55 which is preferably formed of sheet metal and provides a relatively shallow and wide trough 56 and a relatively deep and narrow trough 57 along opposite sides thereof. Upper edges of the outer walls 58 and 59 of said troughs are curled outwardly and downwardly to form finger guides 60 and 61 for use in marking a column 40 of tags 20, as shown in Figs. 6 and 7. Trough 56 is adapted to snugly receive a column 40 of tags 20 with either the edges 21 or the edges 22 of said tags exposed upwardly for marking thereon. Trough 57 is adapted to snugly receive a column 40 of tags 20 with the end edges 23 or 24 of the tags exposed upwardly for marking thereon. In either case, the arcuate ends 23 and 24 of the tags 20 facilitate reception of the column in the troughs 56 and 57.

Fig. 5 illustrates the tray 55 with a column 40 of tags 20 snugly resting in trough 56 preparatory to marking said column. Fig. 6 shows how this marking is done with an ink pen 62 held in the right hand and drawn along the guide 60 of trough 56 so that this guides the hand holding the pin 62 and enables the drawing of a straight line 65 on the upwardly exposed edges of the tags in the column 40 resting in the tray so that this line is parallel with said column.

Fig. 7 shows the opposite end of the tray 55 to that illustrated in Fig. 6 with a column 40 of tags 20 snugly resting in trough 57 with the end edges 23 of the tags exposed upwardly and with an ink pen 62 being drawn lengthwise along the upwardly exposed face of the column 40 to form an ink line 66 on the column which is parallel with the latter and is in a selected position to produce the required marks on the end edges 23 of the tags 20 in said column.

There are 500 tags 20 in each column 40 and one of the lines 65 or 66 may be marked on such a column by inexperienced help each 15 seconds. Thus where two lines are required on a column of tags to indicate on these tags a given date in accordance with the sixty-day retail code above described, a total of a thousand units may thus be marked each minute.

The ninety-day code system of the invention employs a tag "E23C" as shown in Fig. 10 for indicating a date within the first ten days of a month; a card "E23B" as shown in Fig. 11 for identifying a date in the middle ten days of a month and tag "E23A" as shown in Fig. 12 for identifying a date occurring during the last ten days of any month. Each of these tags has printed along its edges 21 and 22 the numbers identifying the days in its respective one-third period of the month. There are then three lines of the names of the months printed in parallel relation on each of these tags. On the upper line appear the names: "Jan., Apr., July and Oct." On the middle line appear the names: "Feb., May, Aug., Nov." On the bottom line appear the names: "Mar., June, Sept. and Dec." A mark placed on end edge 23 of any of these tags opposite one of these lines of names means that the tag indicates a date falling in one of the months named in that line. For easy identification at a distance, these three tags are made of different colored plastic. Tag E23C is made of white plastic, tag E23B is made of yellow plastic, and tag E23A is made of green plastic. This is not necessary but is merely done to permit quick identification at a distance of which portion of the month the tag relates to.

To show how the ninety-day code system works, let us assume that a tag E23C appears on April 15th of any year on a package with marks 68 and 69 applied as shown in Fig. 10. The packing date indicated would either be April 1st or January 1st. If the merchandise is either a fresh fruit or a vegetable, it would be fairly fresh if packed April 1st and badly deteriorated if packed on January 1st. Examination of the product itself would thus readily confirm the date.

Figs. 11 and 12 show how tags E23B and E23A of this ninety-day code system may be marked with marks 70, 71, 72 and 73 to indicate any date on which the tag is attached to a package of fruits or vegetables. As it is easy to distinguish between fruit which is freshly packed and that which is three months old, no difficulty whatever is met with in interpreting these cards and ascertaining exactly the date that is indicated by the ninety-day code on each of these.

The yearly code of the invention which is carried out by the tag 74 as shown in Fig. 13 requires only a single form to be printed on the tag although these are printed in three colors, white indicating the first ten days of each month, yellow indicating the second ten days of each month, and green indicating the 21st through the 31st of the month. The names of the twelve months of the year appear in three columns of four names in each column so that a mark on either edge 21 or 22 of the tag opposite one of these columns and a mark on the end edge 23 of the tab opposite a particular name in said column designates that month as the month of the date indicated by this tag. The balance of the edges of this tag which are not occupied by the month chart are occupied by numbers "21, 23, 25, 27, 29, 31" and "+1." Where this tag 74 is white, a mark 75 opposite "21" indicates the first day of the month. With a mark 75 opposite "21" plus a mark 76 opposite the "+1" indicates the 2nd of the month. Similarly, on a white tag, a mark opposite "29" and no other mark on the numbered half of the tag indicates the 9th of the month. The 10th of the month would be indicated on a white tag with a mark opposite "29" and a mark opposite "+1."

In a similar manner, a yellow tag 20 is used in this code to indicate any date between the 11th and the 20th of the month, and a green tag to indicate any date from the 21st through the 31st of the month.

The tag 80 shown in Fig. 14 bears on the face of it the printed name of a single month and may be used only in carrying out the special thirty-day code of the invention for that particular month. The side edges 21 and 22 of this tag are divided into ten spaces carrying respectively numerals from "1" to "0," while the end edge 23 is divided into three spaces carrying numerals "1," "2" and "3." To illustrate this code, tag 80 is shown as having a mark 85 applied to one of the ten spaces into which side edges 21 and 22 are divided for indicating any of the days from the 1st to the 10th of that month. To indicate any of the other days in the month an additional mark 86 is applied to the edge 23 of the card opposite either the numeral "1," the numeral "2" or the numeral "3."

Tag 90, shown in Fig. 15, is provided to give coded information as to the packing station at which the package was filled with the agricultural product contained therein. In this tag, each of the end edges 23 and 24 is divided into two spaces and these spaces are marked "A," "B," "C" and "D." The side edges 21 and 22 are divided into ten equal spaces which are numbered from 1 to 10. This gives an opportunity to identify any of fifty separate packing stations at which packages of the product originate in a given packing shed. Any of the first ten packing stations will be identified by the application of a mark 91 to one of the divisions into which the edges 21 and 22 are divided, and with no mark placed on either of the ends 23 and 24 of the tag. Stations numbered from 11 to 20 would not only bear mark 91 along one of the side edges of the tag, but a mark 99 which would be applied to one of the end edges of the tag opposite one of the letters "A," "B," "C" or "D."

Fig. 16 illustrates another method of marking the tags, wherein a tag 20a similar to the tag 20 shown in Fig. 8, is marked by placing a column of such tags in the tray 55 and abrading the edges of one wide and one narrow face of the column to produce longitudinal channels therein resulting in individual notches 50a and 51a corresponding to the ink markings 50 and 51. Abrading of the edges of the tag 20a may be accomplished by any conventional abrading instrumentality.

From the foregoing description it is believed clear that the present invention provides a means for code marking and dating packages of a fresh agricultural product which is at once very economical to operate, which combines code marking with labeling the goods and which facilitates keeping close track of the age of each package of produce as it moves through the channels of commerce to ensure a minimum of loss through spoilage.

The tag 20 of the invention also combines the important functions of code marking, labeling and providing a closure for the package, where the product is placed in bags.

The claims are:

1. A method of producing a code marking tag, which comprises: printing a plurality of tags formed of a water-insoluble material that is penetrable by a marking liquid with identical code indicia on one side thereof which gives meaning to a mark applied at a selected location on an edge of said tag; assembling said tags evenly into a column of desired length with the tags stacked so that said one side of said tags all face in the same direction; and forming a line at a selected location on one edge of said tags and running continuously along a given face of said column, using a marking liquid comprising a dye-impregnated solvent for the tag material which penetrates the material of said tags to a sufficient depth that the line applied to the column is clearly visible on said one edge and on said one side of each of said tags when they are separated from said column and viewed individually.

2. A method of producing a code marking tag, which comprises: printing a plurality of tags with identical code indicia on one side thereof which gives meaning to a mark applied at a selected location on an edge of said tag; assembling said tags into a column of desired length with the tags stacked so that said one side of said tags all face in the same direction; positioning said assembled column horizontally with a selected edge of said tags uppermost; forming a permanent line at a selected location on said uppermost edge of said tags and running continuously along the upper face of said assembled column so that said line is clearly visible on said selected edge of said tags when they are separated from said column and viewed individually.

3. The method defined in claim 2, in which each tag has an aperture, including the steps of: extending a metal strap through the apertures of the assembled tags, and bending the ends of the strap over against the tags at the ends of the column to hold the column of tags together to facilitate handling and marking thereof.

4. A method as defined in claim 2, in which the permanent line is formed by abrading the material of the tags to produce a shallow channel in the uppermost face of the column and a uniformly located notch in the edge of the tags.

5. A method of producing a code marking tag, which comprises: printing a plurality of tags with identical code indicia on one side thereof which gives meaning to a mark applied at a selected location on at least one side edge and one end edge of said tag; assembling said tags into a column of desired length with the tags stacked so that said one side of said tags all face in the same direction; positioning said assembled column horizontally with said one side edge of said tags uppermost; forming a permanent line at a selected location on said one side edge of said tags and running continuously along the upper face of said column so that it is clearly visible on said one side edge of said tags when they are separated from said column and viewed individually; turning the assembled column of tags to position said one end edge of said tags uppermost; and forming a similar line at a selected location on the then uppermost end edge of said tags and running continuously along the then upper face of said column.

6. In combination: a substantial number of tags each bearing identical code marking indicia on one side thereof which is given code significance by the application of a mark in a selected location along at least one edge of said tags; means holding said tags assembled together in the form of a column with the tags stacked in the column so that said one side of said tags all face in the same direction; and a tray having a U-shaped trough snugly receiving said assembled column of tags and maintaining the edges of said tags even and with said one edge of said tags disposed uppermost; and longitudinally extending guide means on said tray for use in guiding a marking device while applying a line to said uppermost edge of said tags to produce a longitudinal line on said column at a selected location whereby like marks of like significance can be quickly applied to said uppermost edge of all of said tags of said column.

7. The combination as defined in claim 6, in which the indicia on each tag comprises spaced lines on said one side of the tags extending inwardly from the edge of the tag to be marked and serving as a means to aid in locating the place on the edge of the tag where the marking line is to be drawn.

8. The combination as defined in claim 6, in which each tag is substantially rectangular in shape and said one side of said tag has data printed along both one side edge thereof and along one end edge thereof, and in which the tray is provided with a pair of parallel troughs for successively receiving said column of tags, one of said troughs receiving said column with said one side edge of said tags disposed uppermost and the other of said troughs receiving said column with said one end edge of said tags disposed uppermost, and wherein the guide means on the tray is disposed adjacent the outer side of each of said troughs for use in guiding a marking device for drawing a line on said one side edge of said tags in said column when the latter is disposed in one of said troughs or for drawing a line on said one end edge of said tags in said column when the latter is disposed in the other of said troughs.

9. The combination as defined in claim 8, in which the ends of the rectangular tags are arcuate to facilitate successive reception of said column in said troughs.

10. In combination: a substantial number of tags bearing identical code indicia on one side thereof which is given code significance by the application of a mark at a selected location along certain edges of said tags; means extending through an aperture in each of said tags and holding said tags assembled in the form of a column with said tags stacked in the column so that said one side of said tags all face in the same direction, said tags being substantially rectangular in shape and said one side of said tag having data both along one of its side edges and along one of its end edges including lines extending inwardly from said edges; and an elongated tray having a pair of parallel U-shaped troughs for snugly receiving said assembled column of tags and maintaining the edges of the tags even, one of said troughs receiving said column with said one side edge of said tags disposed uppermost and the other of said troughs receiving said column with said one end edge of said tags disposed uppermost; longitudinally extending guide means on said tray disposed adjacent the outer side of each of said troughs for use in guiding a marking device relative to said lines on said tags for drawing a line on said one side edge of said tags in said column when the column is disposed in said one trough or for drawing a line on said one end edge of said tags in said column when the latter is disposed in said other trough.

11. The combination defined in claim 10, in which said one trough of the tray is shallow and wide and said other trough is relatively deep and narrow, and wherein the upper edge of the outer wall of the respective troughs is curled outwardly and downwardly to form said guide means.

12. In combination: a quantity of like tags each having a non-circular aperture and bearing identical code marking indicia on one side thereof which is given code significance by the application of a mark in a selected location along a certain edge of said tag; and a strap with a non-circular cross section fitting non-rotatably in said aperture, said strap extending through said aperture of all of said tags, with said one side of said tags facing in the same direction, to lock said tags together against substantial rotation relative to each other and in compact superimposed relation, with the same orientation about said strap, to form a column, one of the longitudinal faces of which column is formed by the aforesaid certain edges of said tags, whereby the application of a straight longitudinal mark the full length of said column on said face parallel with said column will apply said mark individually to said certain tag edges to invest said code marking indicia on said tags uniformly with the same code significance.

References Cited in the file of this patent

UNITED STATES PATENTS

| 309,318 | Smyth | Dec. 16, 1884 |
| 1,061,730 | Cole | May 13, 1913 |
| 1,132,222 | Smith | Mar. 16, 1915 |
| 1,271,508 | Hall | July 2, 1918 |

FOREIGN PATENTS

| 120,681 | Austria | July 10, 1931 |